US012462106B2

(12) United States Patent
Douglas et al.

(10) Patent No.: US 12,462,106 B2
(45) Date of Patent: Nov. 4, 2025

(54) GENERATING SECURITY REPORTS

(71) Applicant: Microsoft Technology Licensing, LLC, Redmond, WA (US)

(72) Inventors: Eric Paul Douglas, Kirkland, WA (US); Mario Davis Goertzel, Kirkland, WA (US); Lloyd Geoffrey Greenwald, Murray Hill, NJ (US); Aditi Kamlesh Shah, Redmond, WA (US); Leo Moreno Betthauser, Kirkland, WA (US); Daniel Lee Mace, Bellevue, WA (US); Nicholas Becker, Boulder, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 18/126,183

(22) Filed: Mar. 24, 2023

(65) Prior Publication Data

US 2024/0256780 A1  Aug. 1, 2024

Related U.S. Application Data

(60) Provisional application No. 63/441,533, filed on Jan. 27, 2023.

(51) Int. Cl.
*G06F 40/30* (2020.01)
*G06F 16/3329* (2025.01)
*G06F 21/57* (2013.01)

(52) U.S. Cl.
CPC .......... *G06F 40/30* (2020.01); *G06F 16/3329* (2019.01); *G06F 21/577* (2013.01)

(58) Field of Classification Search
CPC .............................. G06F 40/30; G06F 21/577
See application file for complete search history.

(56) References Cited

U.S. PATENT DOCUMENTS

| 2010/0088341 | A1* | 4/2010 | Ah-Soon | G06F 21/6227 |
| | | | | 707/783 |
| 2018/0205755 | A1* | 7/2018 | Kavi | G06F 21/577 |
| 2022/0036153 | A1 | 2/2022 | O'Malia | |
| 2023/0018808 | A1 | 1/2023 | Silberman | |
| 2023/0229854 | A1* | 7/2023 | McCaffery | G06Q 30/018 |
| | | | | 715/224 |

(Continued)

OTHER PUBLICATIONS

"Long-term Memory for AI," Vector Database for Vector Search, Pinecone Systems, Inc., retrieved from: https://www.pinecone.io/, Mar. 27, 2023, 10 pages.

(Continued)

*Primary Examiner* — Bryan S Blankenagel

(57) ABSTRACT

In some examples, a method of generating a security report is provided. The method includes receiving a user query and security data, and providing the user query and security data to a semantic model. The semantic model generates one or more first embeddings. The method further includes receiving, from a data model, one or more second embeddings. The data model is generated based on historical threat intelligence data. The model further includes generating an execution plan based on the one or more first embeddings and the one or more second embeddings, and returning a report that corresponds to the execution plan.

20 Claims, 12 Drawing Sheets

(56) References Cited

U.S. PATENT DOCUMENTS

2023/0315766 A1* 10/2023 Cho .................. G06F 16/3338
707/722

OTHER PUBLICATIONS

Kan, "Not All Vector Databases Are Made Equal," Towards Data Science, Oct. 2, 2021, retrieved from: https://towardsdatascience.com/milvus-pinecone-vespa-weaviate-vald-gsi-what-unites-these-buzz-words-and-what-makes-each-9c65a3bd0696, Mar. 27, 2023, 15 pages.
International Search Report and Written Opinion received for PCT Application No. PCT/US2023/085903, May 7, 2024, 13 pages.

* cited by examiner

GENERATING SECURITY REPORTS

CROSS-REFERENCE TO RELATED APPLICATION

This application claims priority to U.S. Provisional Application No. 63/441,533, titled "Generating Security Reports," filed on Jan. 27, 2023 the entire disclosure of which is hereby incorporated by reference in its entirety.

BACKGROUND

Security analysts can manually combine security data with threat intelligence data to achieve security goals. The security analysts typical perform their work as off-line tasks prior to or after a security incident. Combining security data with threat intelligence is a brittle process that can fail to match similar, but not exactly the same, entities across security and threat intelligence data.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for generating security reports. In some examples, a user query and security data may be provided. The security data may include raw logs associated with one or more incidents of a computing environment. Further, the user query may be a query provided by a user to achieve a security goal. The user query and security data may be provided to a semantic model that generates one or more first embeddings. One or more second embeddings may be received from a data model. The data model may be generated based on historical threat intelligence data. An execution plan may be generated based on the one or more first embeddings and the one or more second embeddings. Specifically, the execution plan may be generated based on determining instructions based on respective similarities between the second embeddings and the first embeddings. A report may be returned that corresponds to the execution plan.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, security analysts manually combine security data with threat intelligence data to achieve security goals. The security analysts typical perform their work as an off-line task prior to or after a security incident. Combining security data with threat intelligence is a brittle process that can fail to match similar, but not exactly the same, entities across security and threat intelligence data.

Mechanisms provided herein may include the assistance of an artificially intelligent (AI) agent that analyzes security data and automatically pulls in relevant threat intelligence to enrich an investigation in real-time. Security data may consist of incidents or entities surfaced by security tools. Security data may also consist of raw logs from endpoints, networks, clouds, security appliances, and applications. The AI agent can assist in finding relevant entities from security data, automatically generate queries to retrieve threat intelligence (TI) data, extract entities from TI data, and normalizes entities across security and TI data to form a consistent view of the security context.

The AI agent can further perform fuzzy and/or semantic matching to find relevant entities that have been specified differently across different data sources. This AI agent can combine data in real-time or can be executed proactively to find similarities between security data and threat intelligence for further investigation. Mechanisms provided herein may not require parsers for different types of data. The AI agent can automatically generate reports in natural language to document a security incident or potential security investigation. AI generated reports can then be consumed by AI agents as security data to improve this process (e.g., by training itself based on iterations of methods provided herein).

Figure 1:
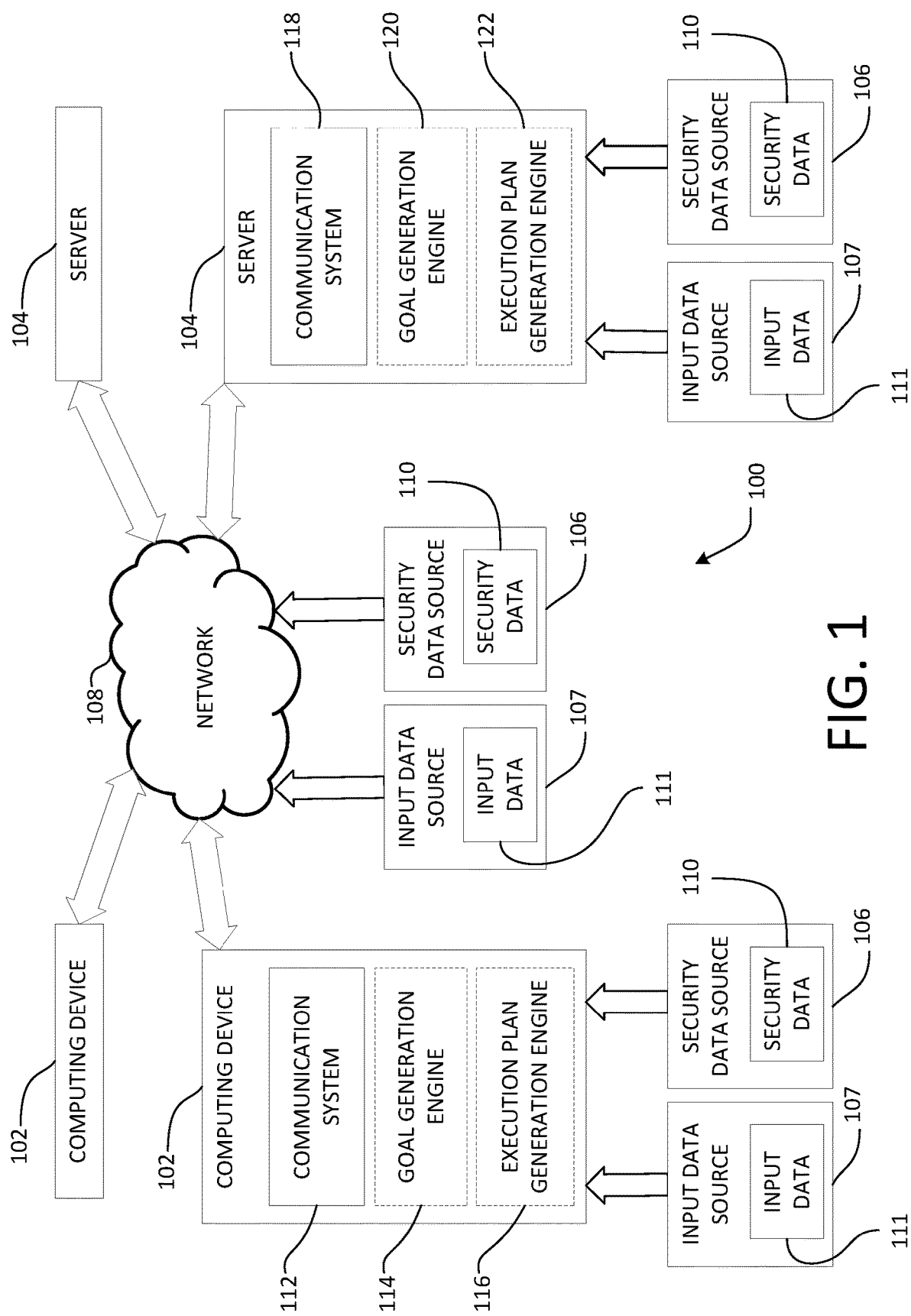
FIG. 1 illustrates an overview of an example system according to some aspects described herein.

FIG. 1 shows an example of a system 100, in accordance with some aspects of the disclosed subject matter. The system 100 may be a system for generating a security report and/or generating an execution plan. The system 100 includes one or more computing devices 102, one or more servers 104, a security data source 106, an input data source 107, and a communication network or network 108.

The computing device 102 can receive security data 110 from the security data source 106, which may be, for example, an endpoint, network, a cloud, a security appliance, a computer-executed program that generates security data, and/or memory with data stored therein corresponding to security data. The security data 110 may be, for example, error files, log files, threat intelligence data, computer terminal records, network records, or some other security data that may be recognized by those of ordinary skill in the art. Additionally, or alternatively, the network 108 can receive security data 110 from the input data source 107.

The computing device 102 can receive input data 111 from the input data source 107, which may be, for example, a camera, a microphone, a computer-executed program that generates input data, and/or memory with data stored therein corresponding to input data. The input data 111 may be, for example, a user-input, such as a voice query, text query, etc., an image, an action performed by a user and/or a device, a computer command, a programmatic evaluation, or some other input data that may be recognized by those of ordinary skill in the art. Additionally, or alternatively, the network 108 can receive input data 111 from the input data source 107.

Computing device 102 may include a communication system 112, goal generation engine or component 114, and/or an execution plan generation engine or component 116. In some examples, computing device 102 can execute at least a portion of the goal generation component 114 to generate an embedding corresponding to a prompt. For example, a user may provide a security-related prompt to resolve a security issue, which is represented by the embedding generated by the goal generation component 114.

In some examples, computing device 102 can execute at least a portion of the execution plan generation component 116 to generate a plan based on historical threat intelligence data, security data, and a user-provided query. For example, the plan may be similar to one or more historical plans that are associated with one or more stored embeddings against which an embedding generated by the goal generation component 114 is compared. In some examples, the plan may include one or more executable skills.

Server 104 may include a communication system 118, goal generation engine or component 120, and/or an execution plan generation engine or component 122. In some examples, server 104 can execute at least a portion of the goal generation component 120 to generate an embedding corresponding to a prompt. For example, a user may provide a security-related prompt to resolve a security issue, which is represented by the embedding generated by the goal generation component 120.

In some examples, server 104 can execute at least a portion of the execution plan generation component 122 to generate a plan based on historical threat intelligence data, security data, and a user-provided query. For example, the plan may be similar to one or more historical plans that are associated with one or more stored embeddings against which an embedding generated by the goal generation component 120 is compared. In some examples, the plan may include one or more executable skills.

Additionally, or alternatively, in some examples, computing device 102 can communicate data received from input data source 107 and/or the security data source 106 to the server 104 over a communication network 108, which can execute at least a portion of the goal generation component 114 and/or the execution plan generation engine 116. In some examples, the goal generation component 114 and/or 120 may execute one or more portions of method/process 700 described below in connection with FIG. 7. Further in some examples, the execution plan generation engine 116 and/or 122 may execute one or more portions of method/process 700 described below in connection with FIG. 7.

In some examples, computing device 102 and/or server 104 can be any suitable computing device or combination of devices, such as a desktop computer, a vehicle computer, a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104. It should be recognized by those of ordinary skill in the art that security data 110 and/or input data 111 may be received at one or more of the plurality of computing devices 102 and/or one or more of the plurality of servers 104, such that mechanisms described herein can generate plans based on the security data 110 and/or input data 111.

In some examples, security data source 106 can be any suitable source of security data (e.g., a microphone, a camera, a sensor, etc.). In a more particular example, security data source 106 can include memory storing security data (e.g., local memory of computing device 102, local memory of server 104, cloud storage, portable memory connected to computing device 102, portable memory connected to server 104, privately-accessible memory, publicly-accessible memory, etc.). In another more particular example, security data source 106 can include an application configured to generate security data. In some examples, security data source 106 can be local to computing device 102. Additionally, or alternatively, security data source 106 can be remote from computing device 102 and can communicate security data 110 to computing device 102 (and/or server 104) via a communication network (e.g., communication network 108).

In some examples, input data source 107 can be any suitable source of input data (e.g., a microphone, a camera, a sensor, etc.). In a more particular example, input data source 107 can include memory storing input data (e.g., local memory of computing device 102, local memory of server 104, cloud storage, portable memory connected to computing device 102, portable memory connected to server 104, privately-accessible memory, publicly-accessible memory, etc.). In another more particular example, input data source 107 can include an application configured to generate input data. In some examples, input data source 107 can be local to computing device 102. Additionally, or alternatively, input data source 107 can be remote from computing device 102 and can communicate input data 111 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
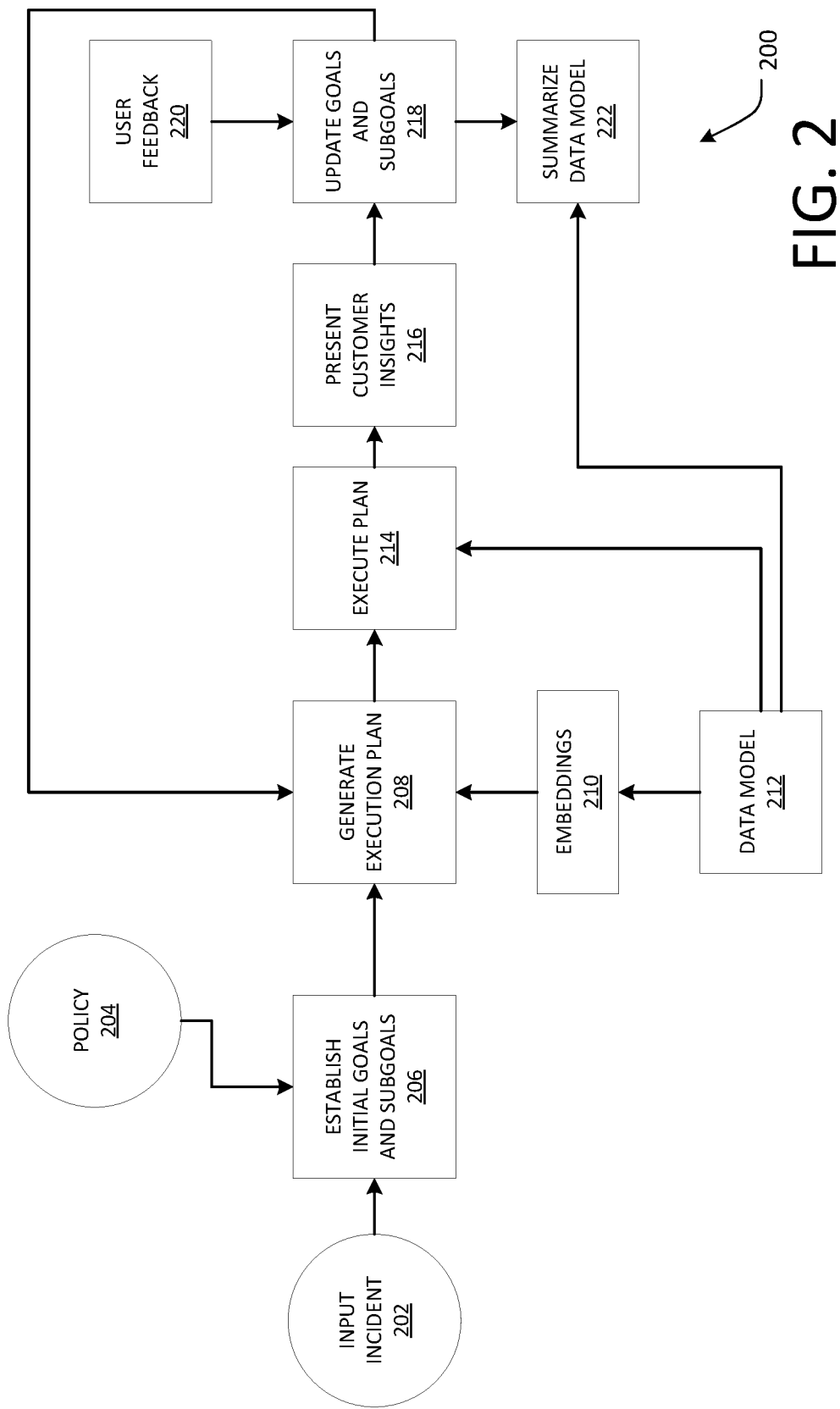
FIG. 2 illustrates an example flow for executing plans, according to some aspects described herein.

FIG. 2 illustrates an example flow 200 for executing plans. In the flow 200, an input incident 202 and a policy 204 are provided to establish initial goals and subgoals 206. The input incident 202 may include security data, such as the security data 106 described with respect to FIG. 1. Further, the policy 204 may include an intent, prompt, and/or query, as may be provided by a user and/or a system.

Establishing the initial goals and subgoals 206 may include generating text and/or one or more first embeddings, such as a first semantic embeddings, based on the provided input incident 202 and the policy 204. The text and/or first embeddings corresponding to the goals may then be provided to an engine to generate an execution plan 208.

The execution plan 208 may be generated by comparing the goal text and/or first embeddings from the establish initial goals 206 to historical text and one or more second embeddings 210 received from a data model 212. The data model 212 may be an embedding object memory that stores embeddings. Additionally, or alternatively, the data model 212 may be an index, database, and/or repository. In some examples, the data model 212 includes historical threat intelligence data which corresponds to the second embeddings 210. For example, each second embedding 210 may correspond to a historical input incident (e.g., similar to the input incident 202), historical policy (e.g., similar to the policy 204), and/or historical plan (e.g., similar to the generated execution plan 208).

The generated execution plan 208 may include natural language and/or computer-readable instructions. In some examples, the flow 200 includes an operation to execute the plan 214. In some examples, one or more aspects of the plan may be executed by a user. Additionally, or alternatively, one or more aspects of the plan may be executed by a system, such as automatically by the system.

In some examples, after executing the plan 214, customer insights are presented 216. The customer insights may include one or more indications corresponding to operations that were performed and/or results that were reached, in response to executing the plan 214. Additionally, or alternatively, presenting the customer insights may include generating a notification for a user indicative of the plan having been executed. In response to presenting the customer insights 216, user feedback 220 may be provided to update the goals and subgoals 218. The user feedback 220 may be in the form of text, selecting an option, providing a gesture, etc. The user feedback 220 may correspond to an indication of whether the execution plan was successful or not successful in resolving the input incident 202.

One or more updated first embeddings may be generated, based on the user feedback 220, that correspond to the updated goals and subgoals 218. The flow 200 may return to generating the execution plan 208, with the updated first embeddings from the updated goals and subgoals 218. Accordingly, the execution plan may be updated based on the one or more updated first embeddings (e.g., corresponding to the updated goals and subgoals 218) and the one or more second embeddings 210.

The user feedback 220 may allow for the execution plan to be modified based on supervised learning (e.g., the user feedback). Further, the user feedback 220 may allow for the execution plan to be personalized (e.g., to a specific user and/or an organization). In some examples, the execution plan may be updated based on user feedback from a single user. Alternatively, in some examples, the execution plan may be updated based on user feedback from a plurality of users.

In some examples, the data model 212 may be summarized 222 to reduce a token size input into a model (e.g., a large language model). For example, if the data model 212 is too large for the embeddings 210 to be generated, then prior to generating the embeddings 210, the data model may be summarized. In some examples, token size may not be a limiting factor for the model into which the data model 212 is provided. In such examples, summarizing the data model 222 may be optional.

Figure 3:
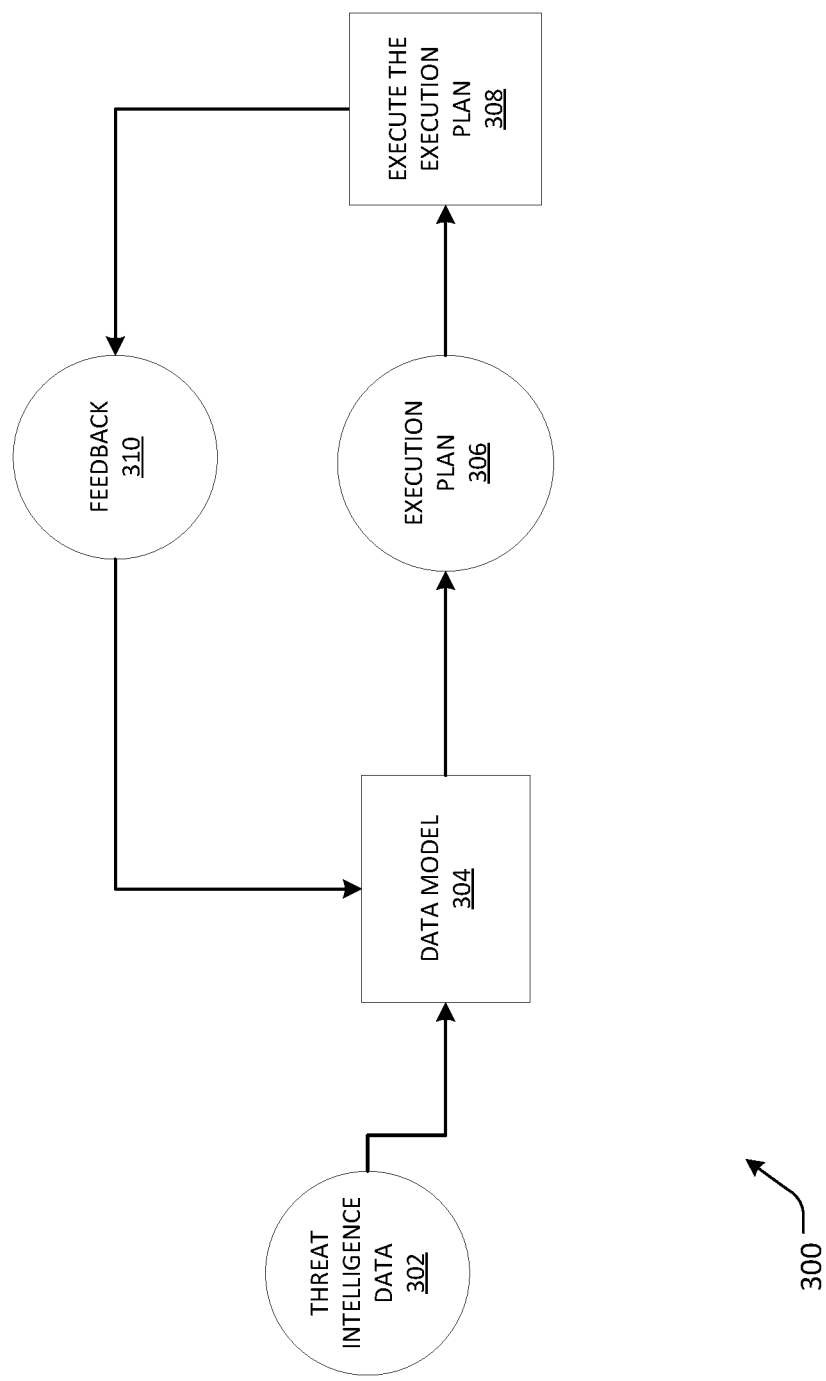
FIG. 3 illustrates an example flow for training a data model, according to some aspects described herein.

FIG. 3 illustrates an example flow 300 for training a data model 304. The data model 304 may be similar to the data model 212 discussed above with respect to FIG. 2. Threat intelligence data 302 may be provided to the data model 304. The threat intelligence data 302 may include knowledge, skills and/or experience-based information concerning the occurrence and assessment of virtual threats, physical threats, and/or threat actors. The threat intelligence data 302 may be intended to help mitigate potential attacks and harmful events that may occur in one or more computing environments. Accordingly, historical threat intelligence data which may be stored in the data model 304 may correspond to previously collected threat intelligence data.

An execution plan 306 may be generated based on the data model 304. For example, the threat intelligence data 302 may match or be significantly similar to historical threat intelligence data that is stored in the data model 304 and to which an execution plan corresponds. Accordingly, the execution plan 306 may be determined based on a similarity of the threat intelligence data 302 to historical threat intelligence data to which a historical execution plan corresponds.

The execution plan 306 may then be executed 308 (e.g., by a user and/or by a system) and feedback 310 may be received based on the execution 308 of the execution plan 306. The data model 304 may be updated based on the feedback 310. For example, if there are a plurality of historical execution plans that are ranked when the threat intelligence data 302 is received, then the historical execution plans stored in the data model 304 may be ranked based on previously-collected feedback for the historical execution plans. For example, a historical execution plan with bad feedback may be ranked lower than a historical execution plan with positive feedback.

Bad feedback may include an indication that the execution plan did not resolve an incident, performed unstable operations, and/or was relatively computationally inefficient. Conversely, good feedback may include an indication that the execution plan did resolve an incident, performed stable operations, and/or was relatively computationally inefficient. The feedback 310 may include discrete metrics that impact rankings of execution plans and/or continuous metrics that impact rankings of execution plans. Further, the feedback 310 may be quantitative feedback and/or qualitative feedback from which rankings can be discerned using techniques recognized by those of ordinary skill in the art.

Figure 4:
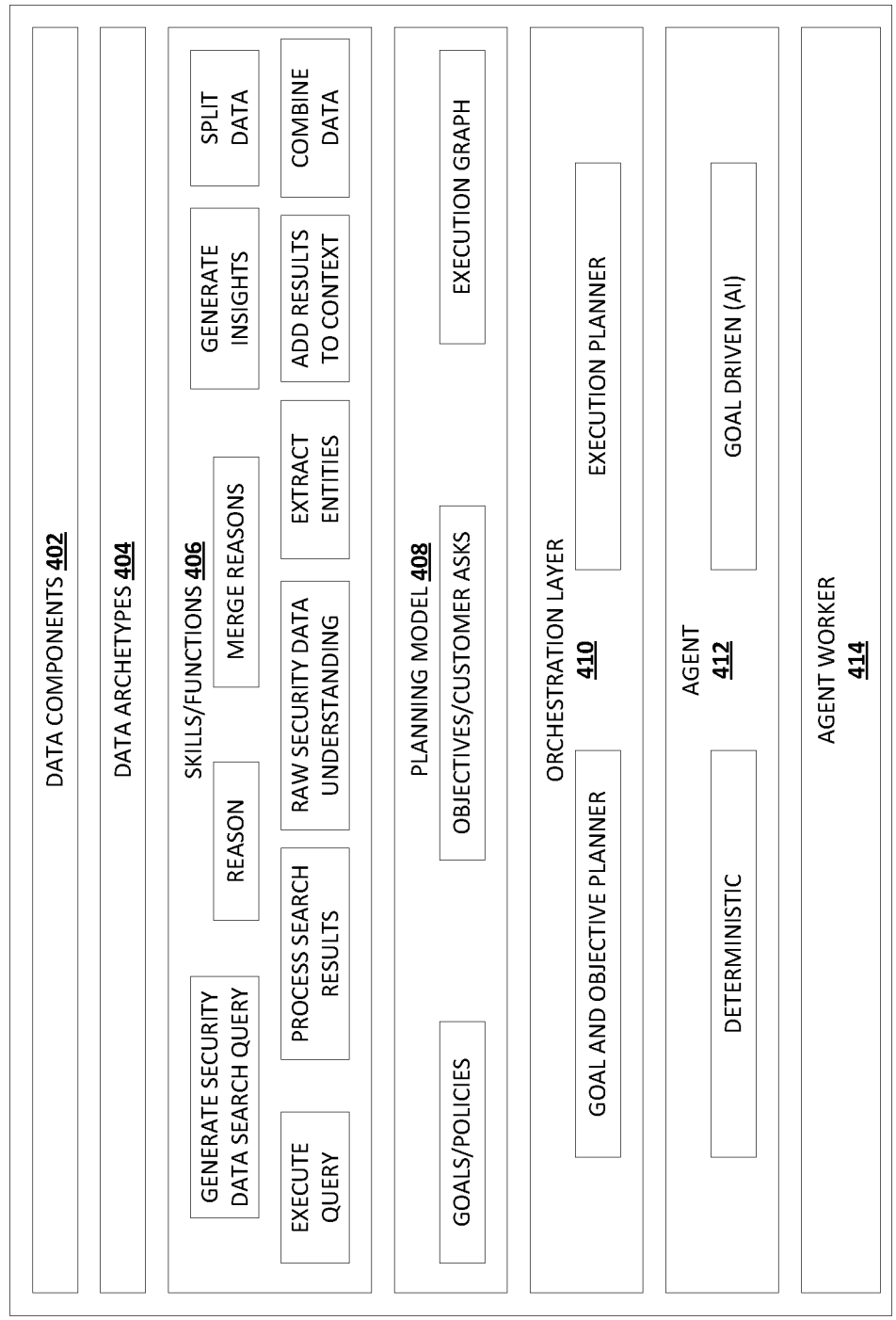
FIG. 4 illustrates an example architecture, according to some aspects described herein.

FIG. 4 illustrates an example architecture 400, according to some aspects described herein. The example architecture includes data components 402, data archetypes 404, skills or functions 406, a planning model 408, an orchestration layer 410, an agent 412, and an agent worker 414.

The data components 402 may include basic data building blocks, such as type classes of data and/or phantom types. Some example aspects of data components 402 include table data components, entity data components, alert data components, and/or summary data components. Further, some data components may include indications of whether corresponding data is small data, valid data, and/or true positive data. Additional and/or alternative aspects of data components 402 may be recognized by those of ordinary skill in the art.

The data archetypes 404 may include a composition of the data components 402. For example, the archetypes 404 may include a table data component with small data and/or an alert data component with true positive data. Additional and/or alternative types of data archetypes 404 may be recognized by those of ordinary skill in the art.

The skills 406 may include abilities that may operate on the data archetypes 404. The skills 406 may include global skills and/or local skills. The skills 406 may operate on all data of a certain type, or a local version (e.g., filtered data). The skills 406 may include a generate security search data, reason, merge reasons, generate insights, split data, execute query, process search results (e.g., includes validation, subsampling, etc.), raw security data understanding (e.g., includes summarizing, answering questions based on logs/threat-intelligence, etc.), extract entities, add results to context (e.g., directly or via a language transformation) such as using one or more query supplemental models that are pre-trained and fine-tuned on supplemental data, and/or combine data. Additional and/or alternative skills that may be included in the skills 406 may be recognized by those of ordinary skill in the art.

The planning model 408 includes data types for handling goals, objects, and/or executions. For example, the planning model 408 may include goals or policies, objectives or customer asks, and an execution graph.

The orchestration layer 410 is responsible for taking a policy and set of customer asks and converting them into a plan and a series of execution graphs. Accordingly, the orchestration layer may include a goal and objective planner component and an execution planner component.

The agent 412 includes a deterministic component and a goal driven (e.g., artificially intelligent) agent component. The agent worker 414 may execute one or more aspects of the agent 412.

Figure 5:
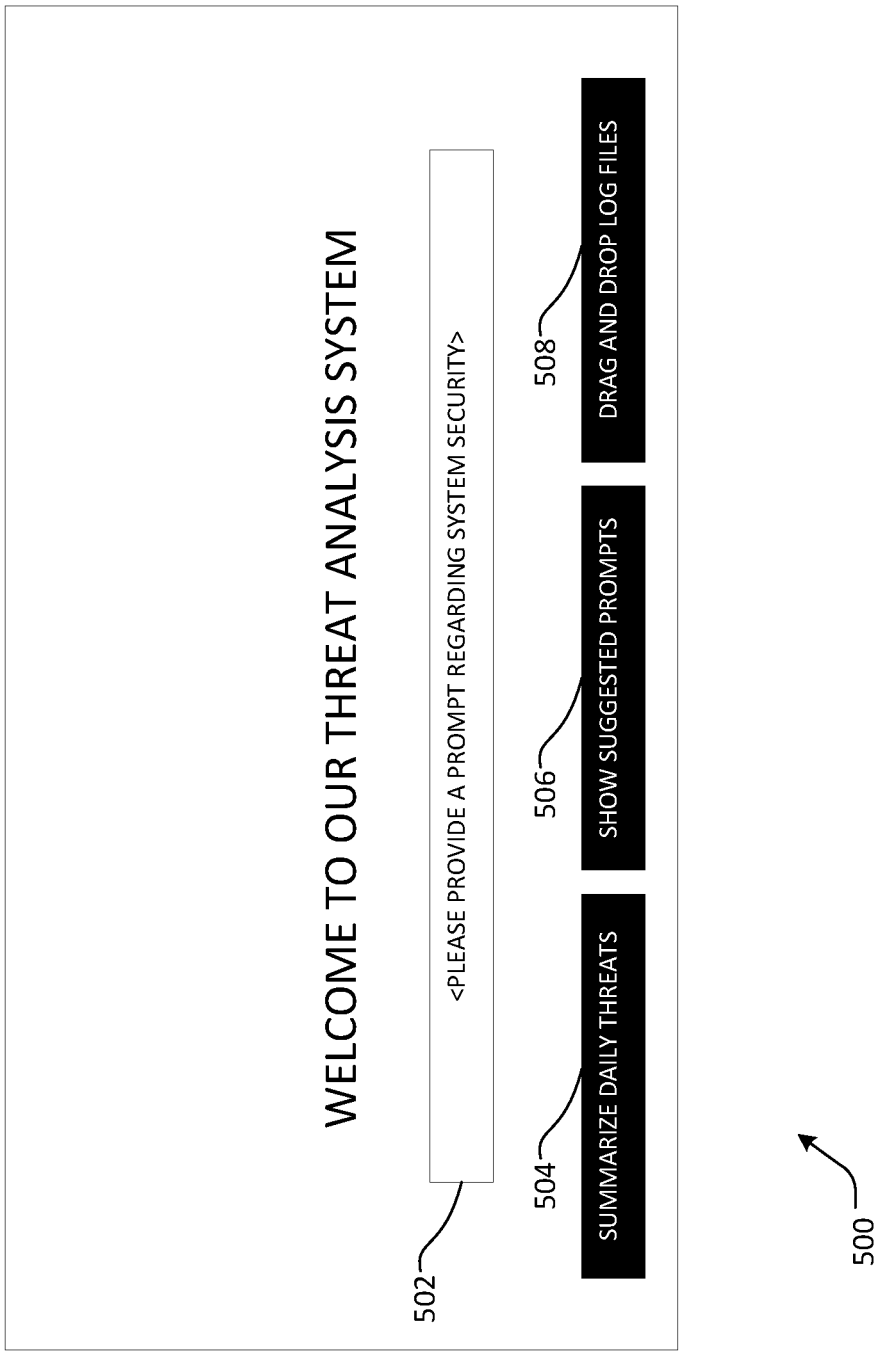
FIG. 5 illustrates an example user-interface, according to some aspects described herein.
Figure 6:
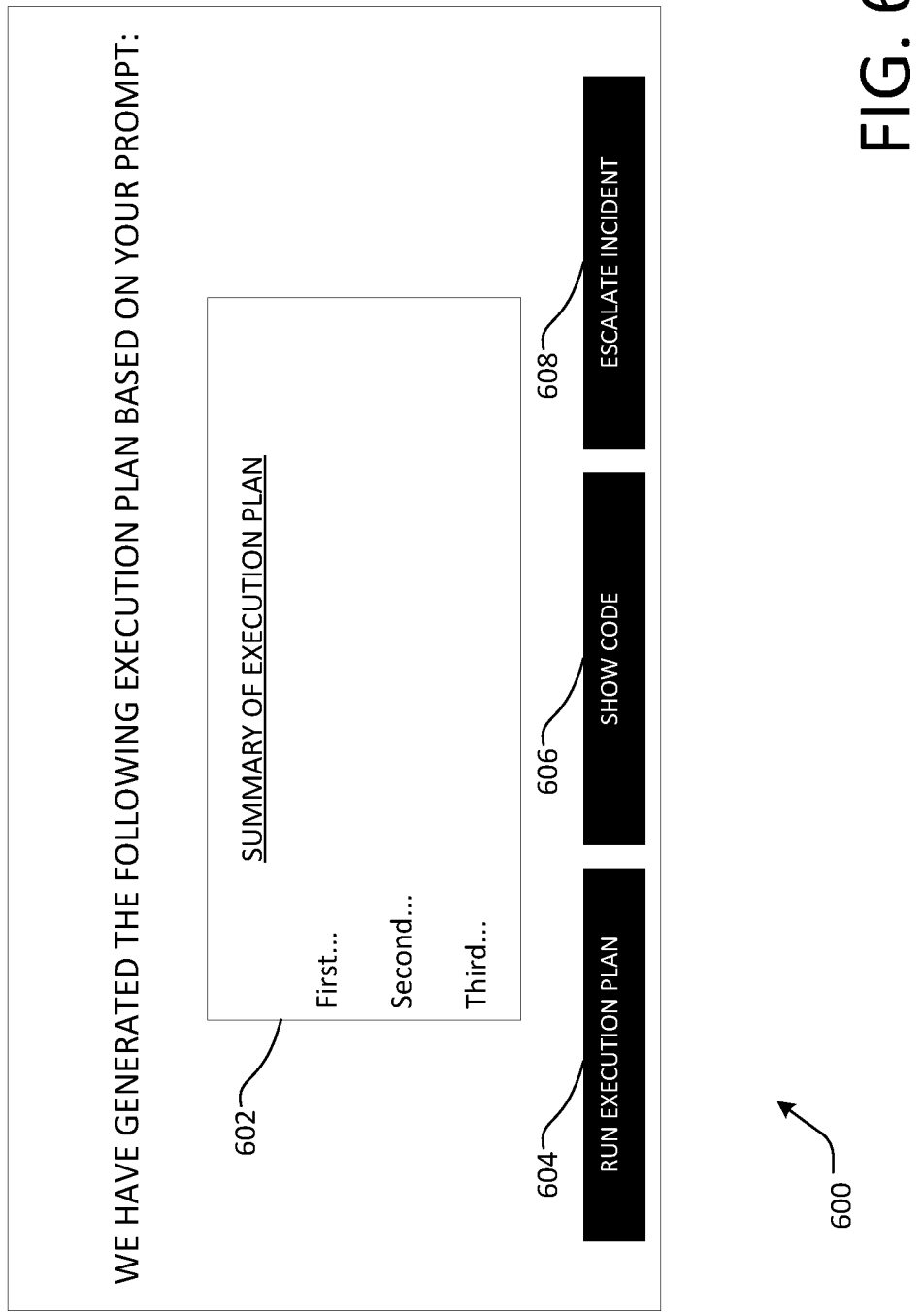
FIG. 6 illustrates an example user-interface, according to some aspects described herein.

FIGS. 5 and 6 illustrate example user interfaces 500 and 600, respectively, according to some aspects described herein. The user interface(s) 500 and/or 600 may be graphical user interface (GUIs) that are displayed on a display screen of a computing device, such as computing device 102. Further, the user interface(s) 500 and/or 600 may be generated by at least one of a computing device and/or server device.

Turning specifically to FIG. 5, the user interface 500 includes a user-input feature 502. The user-input feature 502 may be a text box, a drop-down menu, and/or a button that activities a sensor (e.g., audio, video, gaze, gesture). Alternative types of user-input with which the user-input feature 502 may be compatible may be recognized by those of ordinary skill in the art.

The user-input feature 502 may be configured to receive a prompt and/or query regarding system security. For example, the prompt may be a type of prompt that a user would provide to a security analyst to diagnose and/or resolve a security-related issue, such as for a specific computing environment.

The user interface 500 further includes a first button 504, a second button 506, and a third button 508. While three buttons are shown on the user interface 500, it should be recognized by those of ordinary skill in the art that additional, fewer, and/or alternative buttons may be used in alternative examples. In the illustrated example 500, the first button 504 is configured to generate a summary of daily threats (e.g., security threats), when selected (e.g., by a user or system). Accordingly, selecting the first button 504 may cause a set of operations to be executed that generate a summary of daily threats (e.g., unauthorized access attempts, untrustworthy network connections, high network traffic, abnormal usage, etc.).

In the illustrated example 500, the second button 506 is configured to show suggested prompts. Accordingly, selecting the second button 506 may cause a set of operations to be executed that generate one or more suggested prompts, such as that a user and/or system may enter into the user-input feature 502. Further, in the illustrated example, the third button 508 is configured to allow a user to drag and drop log files. For example, a user may provide raw error log files which a system may analyze for potential security risks. In some examples, mechanisms disclosed herein may analyze the log files based on a query provided by the user. Additionally, or alternatively, in some examples, mechanisms provided herein may analyze the log files without any query provided by the user based on historical knowledge and/or training for performing a security analysis.

Turning specifically to FIG. 6, the user interface 600 includes a summary 602 of an execution plan. The summary 602 may include natural language that a user can understand to determine what steps are being proposed by mechanisms described herein to address a provided prompt.

The user interface 600 further includes a first button 604, a second button 606, and a third button 608. While three buttons are shown on the user interface 600, it should be recognized by those of ordinary skill in the art that additional, fewer, and/or alternative buttons may be used in alternative examples. In the illustrated example 600, the first button 604 is configured to run the execution plan. For example, the execution plan may be executed automatically by one or more computing devices (e.g., computing device 102 and/or server 104) in response to the first button 604 being selected.

In the illustrated example 600, the second button 606 is configured to show code corresponding to a determined execution plan. The code may be in one or more computer languages that may be recognized by those of ordinary skill in the art, such as an object-oriented language, binary, a procedural language, high-level language, low-level language, etc.

Further, in the illustrated example, the third button 608 is configured to escalate an incident. For example, selecting the third button 608 may generate a notification that is transmitted to escalate the incident. The notification may be transmitted to a security analyst, an information technology representative, a supervisor, etc. Generally, the third button 608 provides a user with the ability to request further assistance if the execution plan does not satisfactorily address a provided prompt and/or if the summary of the execution plan leads to further questions that require additional support.

Figure 7:
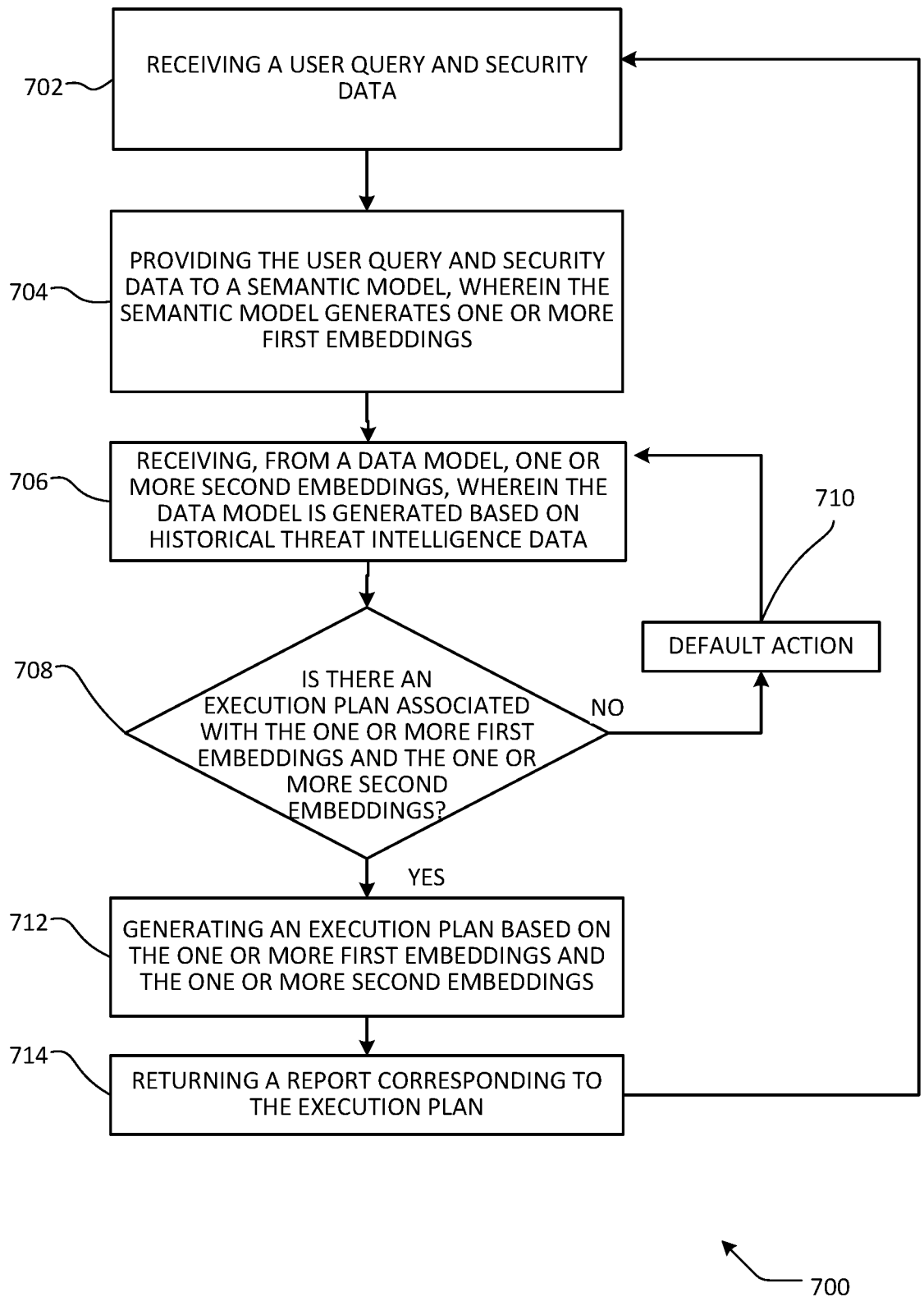
FIG. 7 illustrates an example method for generating a security report, according to some aspects described herein.

FIG. 7 illustrates an example method 700 for generating security reports, according to some aspects described herein. In examples, aspects of method 700 are performed by a device, such as computing device 102 and/or server 104, discussed above with respect to FIG. 1.

Method 700 begins at operation 702 wherein a user query and security data is received. In some examples, the security data corresponds to one or more incidents associated with a computing environment. In some examples, the security data includes raw logs that are associated with one or more incidents (e.g., an error, a breach, a malfunction, an unexpected computer action, etc.). In some examples, the computing environment is one or more of an endpoint, a network, a cloud environment, a security appliance, and/or a computer-executable application.

In some examples, the user query may be a security prompt, such as a security prompt that a user would otherwise provide to a security analyst to investigate a security related matter. Some example user queries may relate to resetting a password, or investigating unauthorized access, or determining the source of a computer error. However, such examples are merely examples. Additional and/or alternative examples of user queries, whether explicitly related to security, or not explicitly related to security, may be recognized by those of ordinary skill in the art.

At operation 704, the user query and security data are provided to a semantic model. The semantic model generates one or more first embeddings. The one or more first embeddings may be semantic embeddings. In some examples, the one or more first embeddings may be goal embeddings that correspond to an intent provided by a user. Further, the semantic model may include a generative large language model (LLM). Additional and/or alternative types of semantic models may be recognized by those of ordinary skill in the art, at least in light of teachings provided herein.

In some examples, the generative LLM may use few-shot prompting. For few-shot prompting, pre-processing may occur for generating a new plan. For example, there may be a limited number of labeled or summarized data elements (e.g., embeddings) and a prediction (e.g., the new plan) may be generated based on the limited number of labeled data elements. In some examples, the generative LLM may use zero-shot prompting. Examples may also utilize one-shot or zero-shot prompting. For zero-shot prompting, there may be no labels or summaries for new data elements (e.g., embeddings), such that algorithms may have to make predictions about new data elements by using prior knowledge about relationships that exist between data elements (e.g., embeddings).

At operation 706, one or more second embeddings are received from a data model. The one or more second embeddings may be semantic embeddings. Further, the one or more second embeddings may be template embeddings that correspond to historical execution plans and/or historical input. The data model is generated based on historical threat intelligence data. The threat intelligence data may include the historical execution plans and/or historical input to which the one or more second embeddings correspond. In some examples, threat intelligence data includes knowledge, skills and/or experience-based information concerning the occurrence and assessment of virtual threats, physical threats, and/or threat actors. The threat intelligence data may be intended to help mitigate potential attacks and harmful events that may occur in one or more computing environments. Accordingly, historical threat intelligence data relates to previously collected threat intelligence data that may be stored in memory or otherwise accessible according to mechanisms provided herein.

At operation 708, it is determined if there is an execution plan associated with the one or more first embeddings and the one or more second embeddings. In some examples, source data that is associated with the first and/or second embeddings may be located (e.g., local to a device on which method 700 is being executed and/or remote from a device on which method 700 is being executed) and the plan may be further determined based on the source data. The source data may include one or more of audio files, text files, image files, video files, threat intelligence data, security reports, log files, data generated by specific software applications, etc.

If it is determined that there is not an execution plan associated with the one or more first embeddings and the one or more second embeddings, flow branches "NO" to operation 710, where a default action is performed. For example, the embeddings may have an associated pre-configured action. In other examples, method 700 may comprise determining whether the embeddings have an associated default action, such that, in some instances, no action may be performed as a result of receiving the embeddings. Method 700 may terminate at operation 710. Alternatively, method 700 may return to operation 702 to provide an iterative loop of receiving a user query and security data, generating one or more embeddings, and determining if there is an execution plan associated with the embeddings.

If however, it is determined that there is a plan associated with the one or more first embeddings and the one or more second embeddings, flow instead branches "YES" to operation 712, where the execution plan is generated based on the one or more first embeddings and the one or more second embeddings. In some examples, the generating an execution plan includes determining a respective similarity between the second embeddings and the first embeddings. For example, the similarity may be determined based on a ranking and/or distance measurement (e.g., cosine distance, Euclidean distance, etc.). The generating an execution plan may further include determining instructions based on the similarities between the second embeddings and the first embeddings and generating the execution plan based on the instructions.

In some examples, the instructions may correspond to skills, such as the skills discussed with respect to FIG. 4. For example, the skills may include one or more of generate query language, reason, merge reasons, generate insights, split data, execute query language, validate query language, lookup threat intelligence, extract entities, and/or combine data. Additionally and/or alternatively, in some examples, the execution plan can include skills that were not previously stored. Accordingly, method 700 may include generating its owns skills (e.g., in the form of computer-readable instructions) to perform desired operations.

At operation 714, a report is returned that corresponds to the execution plan. In some examples, the report includes one or more of natural language that corresponds to instructions for resolving a security incident. In some examples, the report includes computer-readable instructions and the method 700 further includes executing the instructions to perform a set of operations based on the execution plan. In some examples, the method 700 includes automatically executing the execution plan via one or more processors (e.g., of a computing device, such as the computing device 102, and/or of a server device, such as the server 104).

In some examples, the execution plan is provided as an output. For example, the plan may be provided as an output to a user, a system on which method 700 is being executed, and/or a system remote from that on which method 700 is being executed. Further in some examples, the method 700 may further include adapting a computing device to execute the plan that is provided. The execution plan may be any of a plurality of different execution plans. For example, the plan may be a plan that is performed by a user and/or by a system. The plan may include instructions and/or information that are output to a user.

In some examples, user feedback is received based on the report. One or more updated first embeddings may be generated based on the user feedback (e.g., by a model, such as a machine learning model, large language model, etc.). Further, the execution plan may be updated based on the one or more updated first embeddings and the one or more second embeddings. The user feedback may allow for the execution plan to be modified based on supervised learning (e.g., user-provided feedback). Further, the user feedback may allow for the execution plan to be personalized (e.g., to a specific user and/or an organization). In some examples, the execution plan may be updated based on user feedback from a single user. Alternatively, in some examples, the execution plan may be updated based on user feedback from a plurality of users.

Figure 8A:
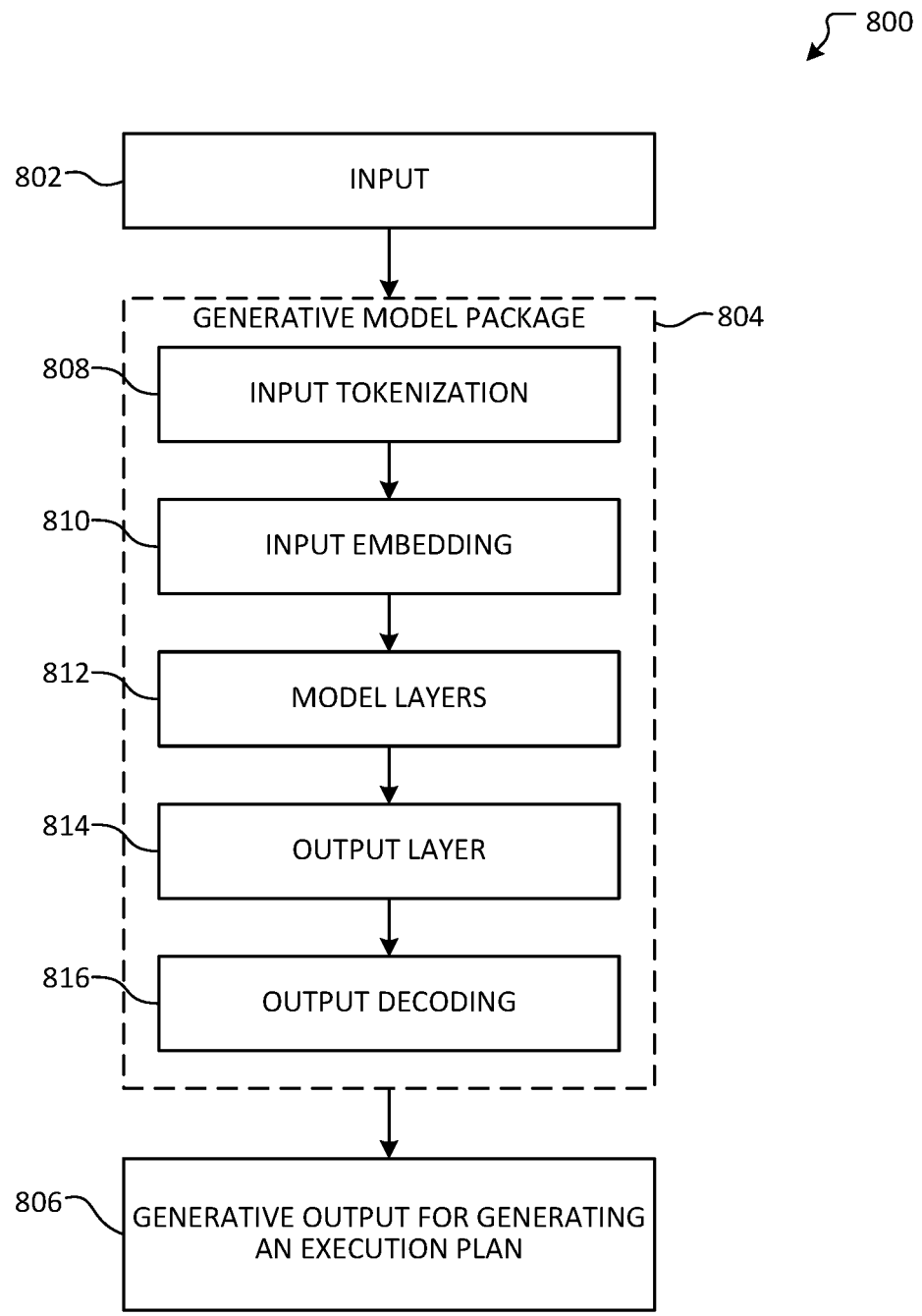
FIGS. 8A and 8B illustrate overviews of an example generative machine learning model that may be used according to aspects described herein.
Figure 8B:
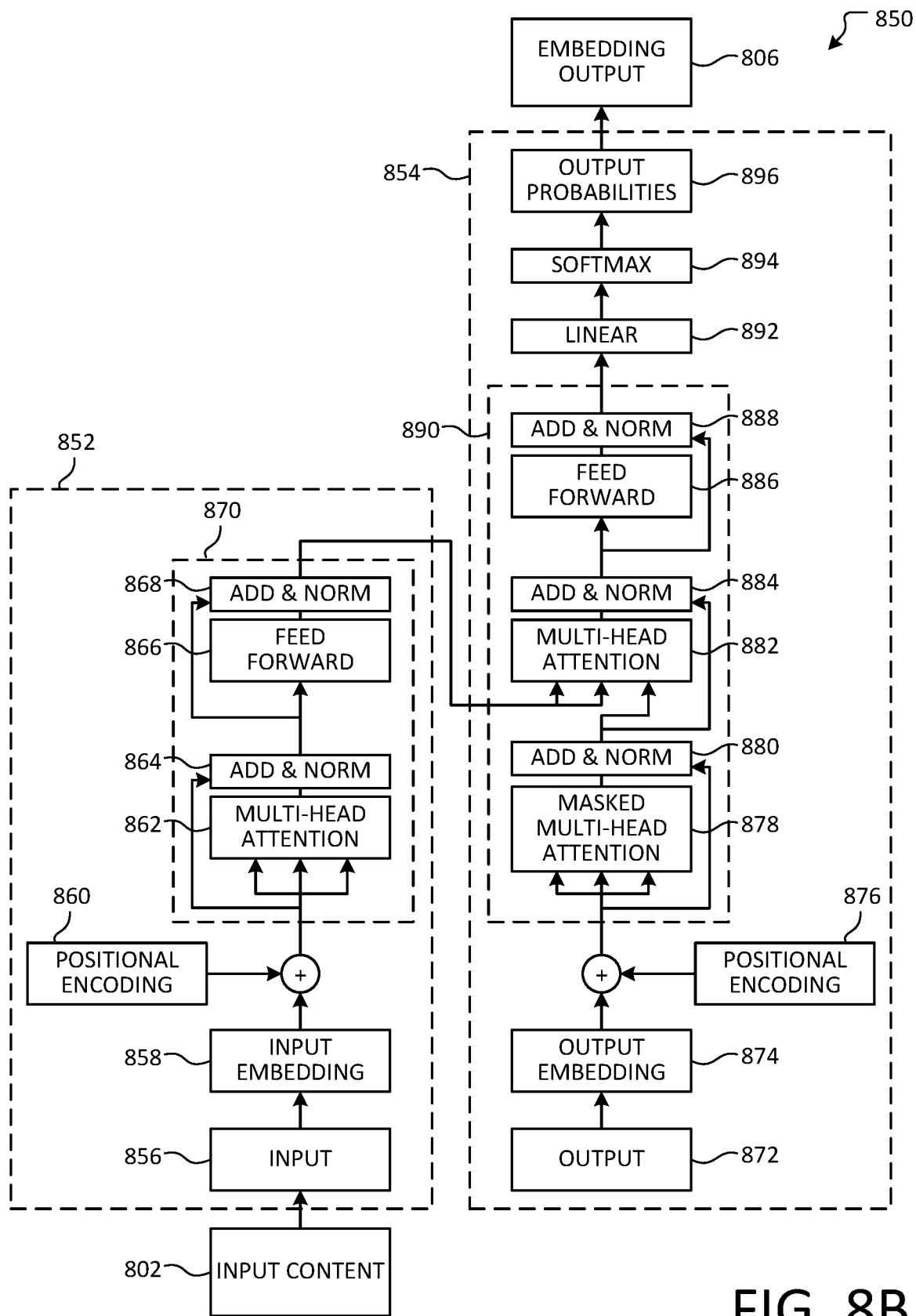

FIGS. 8A and 8B illustrate overviews of an example generative machine learning model that may be used according to aspects described herein. With reference first to FIG. 8A, conceptual diagram 800 depicts an overview of pre-trained generative model package 804 that processes an input 802 to generate model output for generating an execution plan 806 according to aspects described herein. Examples of pre-trained generative model package 804 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Open-science Open-access Multilingual Language Model), DALL-E, DALL-E 2, Stable Diffusion, or Jukebox.

In examples, generative model package 804 is pre-trained according to a variety of inputs (e.g., a variety of human languages, a variety of programming languages, and/or a variety of content types) and therefore need not be finetuned or trained for a specific scenario. Rather, generative model package 804 may be more generally pre-trained, such that input 802 includes a prompt that is generated, selected, or otherwise engineered to induce generative model package 804 to produce certain generative model output 806. For example, a prompt includes a context and/or one or more completion prefixes that thus preload generative model package 804 accordingly. As a result, generative model package 804 is induced to generate output based on the prompt that includes a predicted sequence of tokens (e.g., up to a token limit of generative model package 804) relating to the prompt. In examples, the predicted sequence of tokens is further processed (e.g., by output decoding 816) to yield output 806. For instance, each token is processed to identify a corresponding word, word fragment, or other content that forms at least a part of output 806. It will be appreciated that input 802 and generative model output 806 may each include any of a variety of content types, including, but not limited to, text output, image output, audio output, video output, programmatic output, and/or binary output, among other examples. In examples, input 802 and generative model output 806 may have different content types, as may be the case when generative model package 804 includes a generative multimodal machine learning model.

As such, generative model package 804 may be used in any of a variety of scenarios and, further, a different generative model package may be used in place of generative model package 804 without substantially modifying other associated aspects (e.g., similar to those described herein with respect to FIGS. 1-7). Accordingly, generative model package 804 operates as a tool with which machine learning processing is performed, in which certain inputs 802 to generative model package 804 are programmatically generated or otherwise determined, thereby causing generative model package 804 to produce model output 806 that may subsequently be used for further processing.

Generative model package 804 may be provided or otherwise used according to any of a variety of paradigms. For example, generative model package 804 may be used local to a computing device (e.g., computing device 102 in FIG. 1) or may be accessed remotely from a machine learning service. In other examples, aspects of generative model package 804 are distributed across multiple computing devices. In some instances, generative model package 804 is accessible via an application programming interface (API), as may be provided by an operating system of the computing device and/or by the machine learning service, among other examples.

With reference now to the illustrated aspects of generative model package 804, generative model package 804 includes input tokenization 808, input embedding 810, model layers 812, output layer 814, and output decoding 816. In examples, input tokenization 808 processes input 802 to generate input embedding 810, which includes a sequence of symbol representations that corresponds to input 802. Accordingly, input embedding 810 is processed by model layers 812, output layer 814, and output decoding 816 to produce model output 806. An example architecture corresponding to generative model package 804 is depicted in FIG. 8B, which is discussed below in further detail. Even so, it will be appreciated that the architectures that are illustrated and described herein are not to be taken in a limiting sense and, in other examples, any of a variety of other architectures may be used.

FIG. 8B is a conceptual diagram that depicts an example architecture 850 of a pre-trained generative machine learning model that may be used according to aspects described herein. As noted above, any of a variety of alternative architectures and corresponding ML models may be used in other examples without departing from the aspects described herein.

As illustrated, architecture 850 processes input 802 to produce generative model output 806, aspects of which were discussed above with respect to FIG. 8A. Architecture 850 is depicted as a transformer model that includes encoder 852 and decoder 854. Encoder 852 processes input embedding 858 (aspects of which may be similar to input embedding 810 in FIG. 8A), which includes a sequence of symbol representations that corresponds to input 856. In examples, input 856 includes input content 802 which may include a user-input and/or a machine-generated input, such as a prompt, a command, context, or the like.

Further, positional encoding 860 may introduce information about the relative and/or absolute position for tokens of input embedding 858. Similarly, output embedding 874 includes a sequence of symbol representations that correspond to output 872, while positional encoding 876 may similarly introduce information about the relative and/or absolute position for tokens of output embedding 874.

As illustrated, encoder 852 includes example layer 870. It will be appreciated that any number of such layers may be used, and that the depicted architecture is simplified for illustrative purposes. Example layer 870 includes two sub-layers: multi-head attention layer 862 and feed forward layer 866. In examples, a residual connection is included around each layer 862, 866, after which normalization layers 864 and 868, respectively, are included.

Decoder 854 includes example layer 890. Similar to encoder 852, any number of such layers may be used in other examples, and the depicted architecture of decoder 854 is simplified for illustrative purposes. As illustrated, example layer 890 includes three sub-layers: masked multi-head attention layer 878, multi-head attention layer 882, and feed forward layer 886. Aspects of multi-head attention layer 882 and feed forward layer 886 may be similar to those discussed above with respect to multi-head attention layer 862 and feed forward layer 866, respectively. Additionally, masked multi-head attention layer 878 performs multi-head attention over the output of encoder 852 (e.g., output 872). In examples, masked multi-head attention layer 878 prevents positions from attending to subsequent positions. Such masking, combined with offsetting the embeddings (e.g., by one position, as illustrated by multi-head attention layer 882), may ensure that a prediction for a given position depends on known output for one or more positions that are less than the given position. As illustrated, residual connections are also included around layers 878, 882, and 886, after which normalization layers 880, 884, and 888, respectively, are included.

Multi-head attention layers 862, 878, and 882 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 8B (e.g., by a corresponding normalization layer 864, 880, or 884).

Feed forward layers 866 and 886 may each be a fully connected feed-forward network, which applies to each position. In examples, feed forward layers 866 and 886 each include a plurality of linear transformations with a rectified linear unit activation in between. In examples, each linear transformation is the same across different positions, while different parameters may be used as compared to other linear transformations of the feed-forward network.

Additionally, aspects of linear transformation 892 may be similar to the linear transformations discussed above with respect to multi-head attention layers 862, 878, and 882, as well as feed forward layers 866 and 886. Softmax 894 may further convert the output of linear transformation 892 to predicted next-token probabilities, as indicated by output probabilities 896. It will be appreciated that the illustrated architecture is provided in as an example and, in other examples, any of a variety of other model architectures may be used in accordance with the disclosed aspects. In some instances, multiple iterations of processing are performed according to the above-described aspects (e.g., using generative model package 804 in FIG. 8A or encoder 852 and decoder 854 in FIG. 8B) to generate a series of output tokens (e.g., words), for example which are then combined to yield a complete sentence (and/or any of a variety of other content). It will be appreciated that other generative models may generate multiple output tokens in a single iteration and may thus use a reduced number of iterations or a single iteration.

Accordingly, output probabilities 896 may thus form embedding output 806 according to aspects described herein, such that the output of the generative ML model (e.g., which may include structured output) is used as input for determining an execution plan according to aspects described herein (e.g., similar to the execution plan generation engine 116 of FIG. 1). In other examples, output 806 is provided as generated output for executing a plan.

Figure 9:
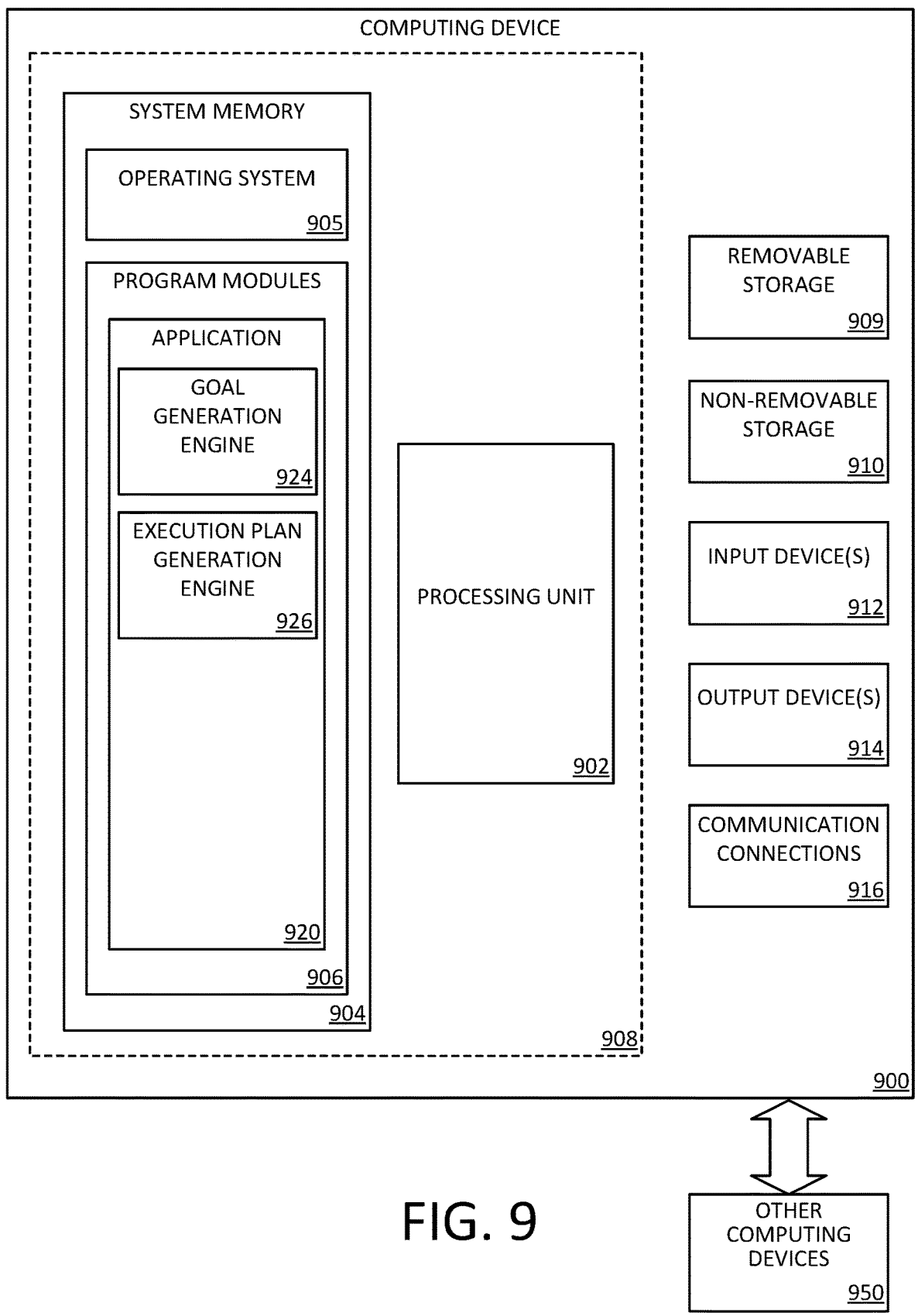
FIG. 9 illustrates a block diagram illustrating example physical components of a computing device with which aspects of the disclosure may be practiced.
Figure 10:
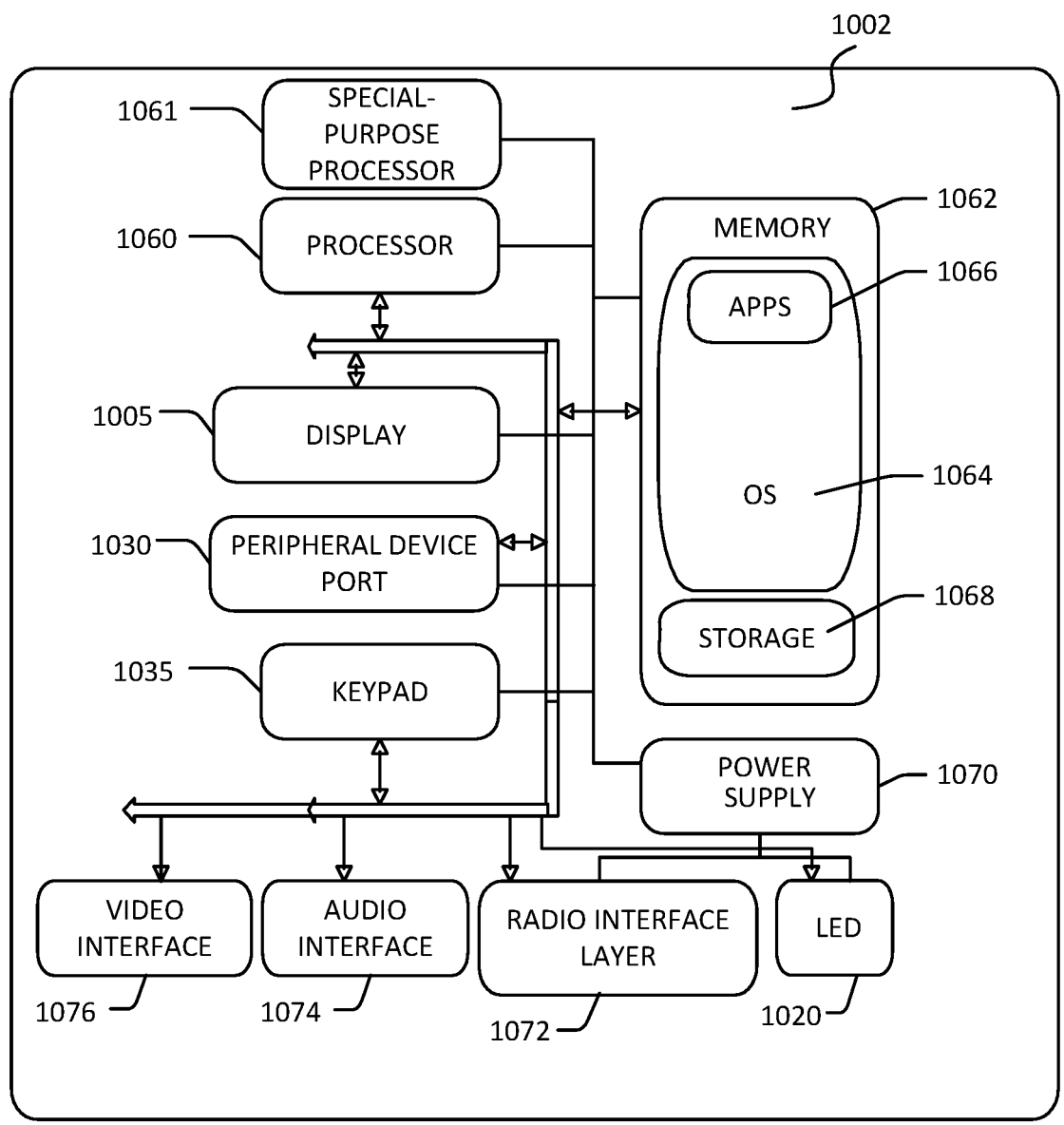
FIG. 10 illustrates a simplified block diagrams of a computing device with which aspects of the present disclosure may be practiced.
Figure 11:
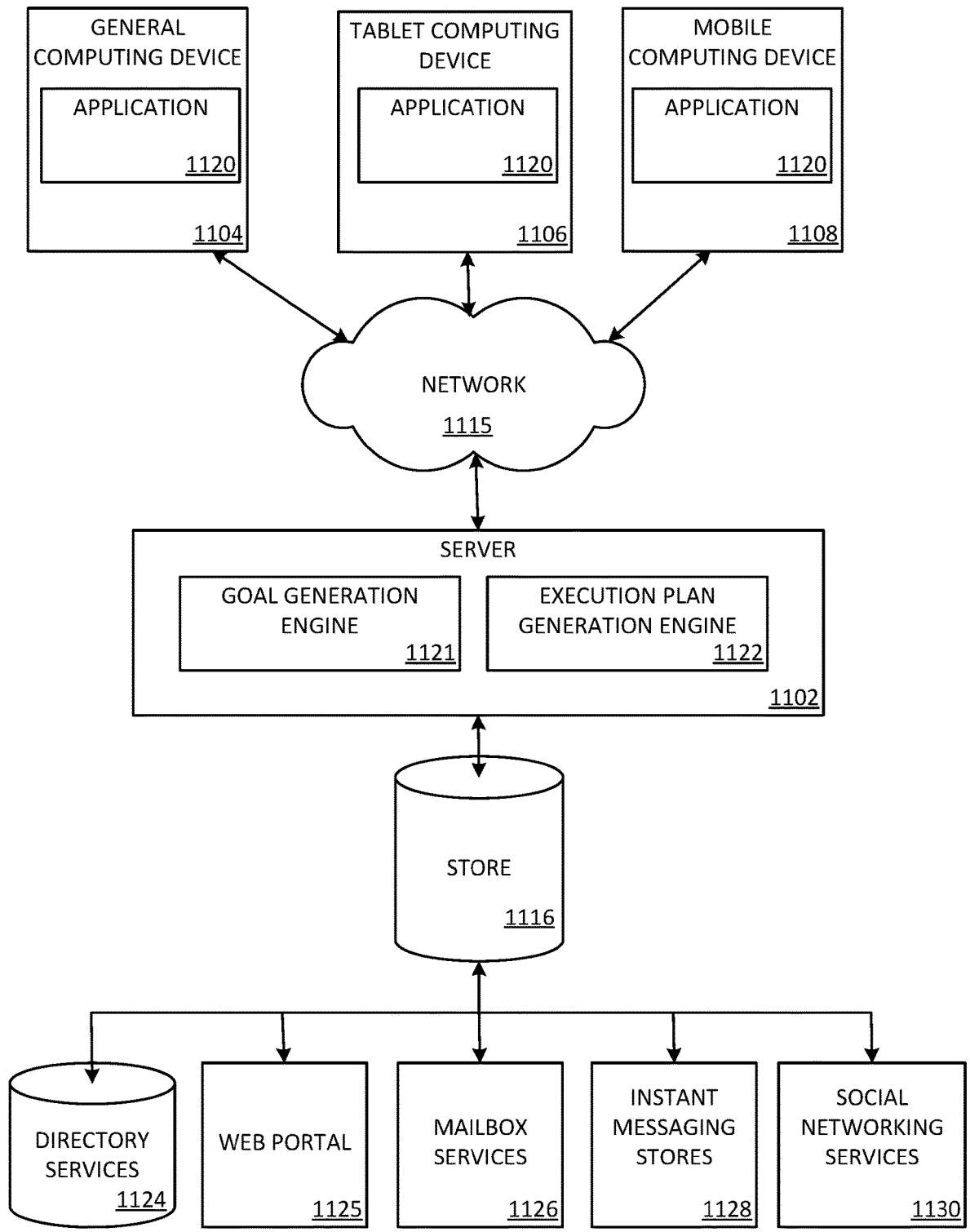
FIG. 11 is a simplified block diagram of a distributed computing system in which aspects of the present disclosure may be practiced.

FIGS. 9-11 and the associated descriptions provide a discussion of a variety of operating environments in which aspects of the disclosure may be practiced. However, the devices and systems illustrated and discussed with respect to FIGS. 9-11 are for purposes of example and illustration and are not limiting of a vast number of computing device configurations that may be utilized for practicing aspects of the disclosure, described herein.

FIG. 9 is a block diagram illustrating physical components (e.g., hardware) of a computing device 900 with which aspects of the disclosure may be practiced. The computing device components described below may be suitable for the computing devices described above, including computing device 102 in FIG. 1. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store goal generation engine 924 and/or execution plan generation engine 926. The operating system 905, for example, may be suitable for controlling the operation of the computing device 900.

Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 10 is a block diagram illustrating the architecture of one aspect of a computing device. That is, the computing device can incorporate a system (e.g., an architecture) 1002 to implement some aspects. In some examples, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone. The system 1002 of FIG. 10 includes a display 1005 and a keypad 1035.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., an embedding object memory insertion engine, an embedding object memory retrieval engine, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and/or special-purpose processor 1061 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to an audio transducer (not shown), the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A computing device implementing the system 1002 may have additional features or functionality. For example, the computing device may also include additional data storage devices (removable and/or non-removable) such as, magnetic disks, optical disks, or tape. Such additional storage is illustrated in FIG. 10 by the non-volatile storage area 1068.

Data/information generated or captured by the computing device and stored via the system 1002 may be stored locally on the computing device, as described above, or the data may be stored on any number of storage media that may be accessed by the device via the radio interface layer 1072 or via a wired connection between the computing device and a separate computing device associated with the computing device, for example, a server computer in a distributed computing network, such as the Internet. As should be appreciated such data/information may be accessed via the computing device via the radio interface layer 1072 or via a distributed computing network. Similarly, such data/information may be readily transferred between computing devices for storage and use according to well-known data/information transfer and storage means, including electronic mail and collaborative data/information sharing systems.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1124, a web portal 1125, a mailbox service 1126, an instant messaging store 1128, or a social networking site 1130.

An application 1120 (e.g., similar to the application 920) may be employed by a client that communicates with server device 1102. Additionally, or alternatively, goal generation engine 1121 and/or execution plan generation engine 1122 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these examples of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of generating security reports, the method comprising:
   receiving a user query and security data corresponding to one or more security incidents associated with a computing environment;
   providing the user query and security data to a semantic model, wherein the semantic model generates one or more first embeddings;
   receiving, from a data model, one or more second embeddings, wherein the data model is generated based on historical threat intelligence data;
   generating an execution plan based on the one or more first embeddings and the one or more second embeddings;
   returning a report corresponding to the execution plan, the report comprising one or more instructions for resolving the one or more security incidents; and
   causing the one or more instructions of the report corresponding to the execution plan to be executed, thereby resolving the one or more security incidents associated with the computing environment.

2. The method of claim 1, wherein the semantic model comprises a generative large language model (LLM) that uses one of zero-shot, one-shot, or few-shot prompting.

3. The method of claim 1, wherein the generating an execution plan comprises:
   determining a respective similarity between the second embeddings and the first embeddings;
   determining instructions based on the similarities between the second embeddings and the first embeddings; and
   generating the execution plan based on the instructions.

4. The method of claim 1, wherein the report comprises natural language corresponding to instructions for resolving the one or more security incidents.

5. The method of claim 1, wherein the report comprises computer-readable instructions, and wherein the method further comprises:
   executing the instructions to perform a set of operations based on the execution plan.

6. The method of claim 1, further comprising:
   receiving user feedback based on the report;
   generating one or more updated first embeddings based on the user feedback; and
   updating the execution plan based on the one or more updated first embeddings and the one or more second embeddings.

7. The method of claim 1, wherein the security data comprises raw logs associated with the one or more security incidents.

8. The method of claim 1, wherein the computing environment is one or more of an endpoint, network, cloud environment, security appliance, or computer-executable application.

9. The method of claim 1, wherein the security data comprises network records, and wherein the one or more security incidents being resolved includes a network security incident.

10. The method of claim 1, further comprising:
causing a graphical user interface to be displayed;
receiving the user query via the graphical user interface; and
causing the report to be displayed via the graphical user interface, the graphical user interface comprising a button that when selected is configured to cause one or more processors to execute the one or more instructions of the report corresponding to the execution plan.

11. A system for generating security reports, the system comprising:
a processor; and
memory comprising instructions that, when executed by the processor, cause the system to perform a set of operations, the set of operations comprising:
receiving a user query and security data corresponding to one or more security incidents associated with a computing environment;
providing the user query and security data to a semantic model, wherein the semantic model generates one or more first embeddings;
receiving, from a data model, one or more second embeddings, wherein the data model is generated based on historical threat intelligence data;
generating an execution plan based on the one or more first embeddings and the one or more second embeddings;
returning a report corresponding to the execution plan, the report comprising one or more instructions for resolving the one or more security incidents; and
causing the one or more instructions of the report corresponding to the execution plan to be executed, thereby resolving the one or more security incidents associated with the computing environment.

12. The system of claim 11, wherein the semantic model comprises a generative large language model (LLM) that uses one of zero-shot, one-shot, or few-shot prompting.

13. The system of claim 11, wherein the generating an execution plan comprises:
determining a respective similarity between the second embeddings and the first embeddings;
determining instructions based on the similarities between the second embeddings and the first embeddings; and
generating the execution plan based on the instructions.

14. The system of claim 11, wherein the report comprises natural language corresponding to instructions for resolving the one or more security incidents.

15. The system of claim 11, wherein the report comprises computer-readable instructions, and wherein the set of operations further comprise:
executing the instructions to perform a set of operations based on the execution plan.

16. The system of claim 11, wherein the set of operations further comprise:
receiving user feedback based on the report;
generating one or more updated first embeddings based on the user feedback; and
updating the execution plan based on the one or more updated first embeddings and the one or more second embeddings.

17. The system of claim 11, wherein the security data comprises raw logs associated with the one or more security incidents.

18. The system of claim 11, wherein the computing environment is one or more of an endpoint, network, cloud environment, security appliance, or computer-executable application.

19. A method of generating security reports, the method comprising:
receiving a user query and security data corresponding to one or more security incidents associated with a computing environment;
providing the user query and security data to a semantic model, wherein the semantic model generates one or more first embeddings;
receiving, from a data model, one or more second embeddings;
generating an execution plan based on the one or more first embeddings and the one or more second embeddings, for resolving the one or more security incidents; and
automatically executing the execution plan via one or more processors, thereby resolving the one or more security incidents associated with the computing environment.

20. The method of claim 19, wherein the security data comprises raw logs corresponding to the one or more security incidents associated with a computing environment.

* * * * *